(No Model.)
2 Sheets—Sheet 1.
F. F. KANNE.
HARVESTER REEL.
No. 272,057. Patented Feb. 13, 1883.
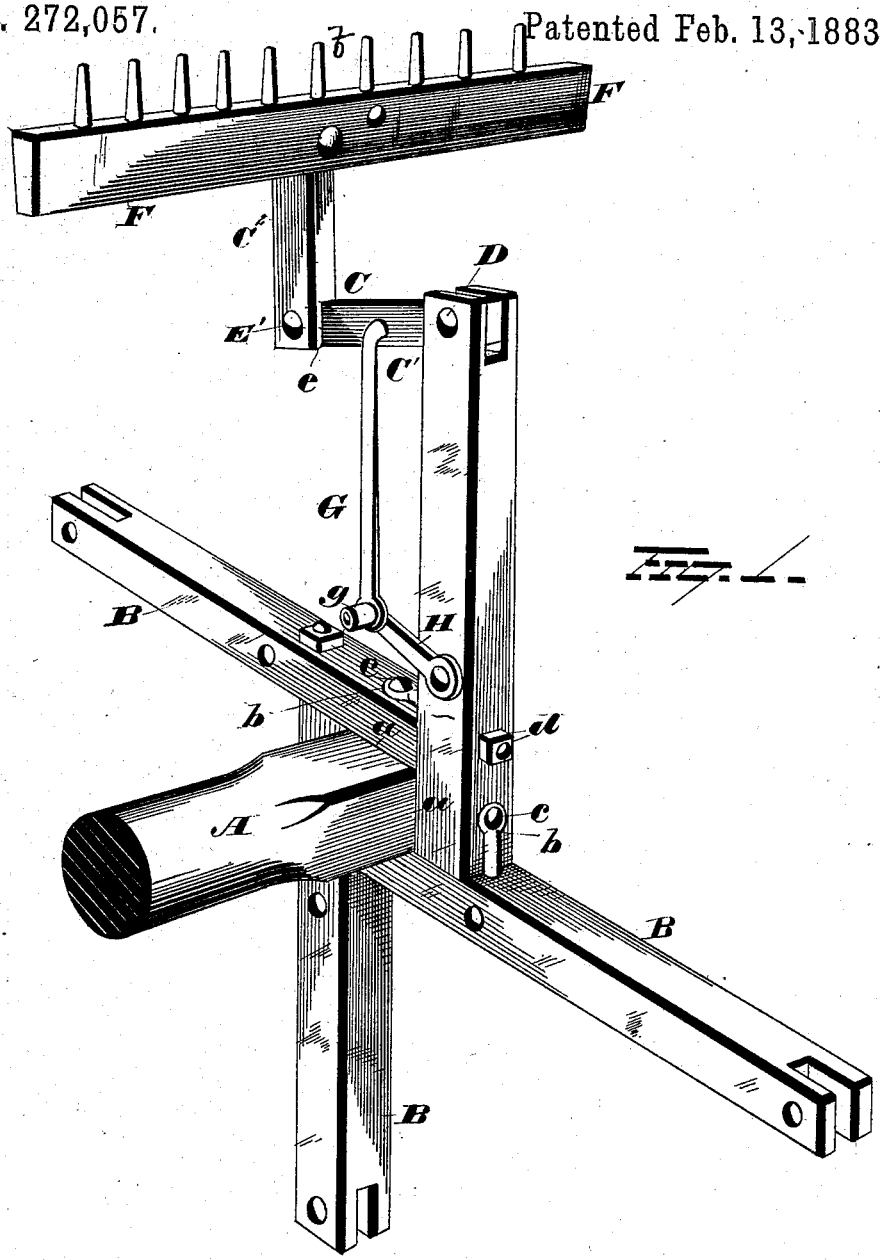
WITNESSES
INVENTOR
F. F. Kanne.
Attorney

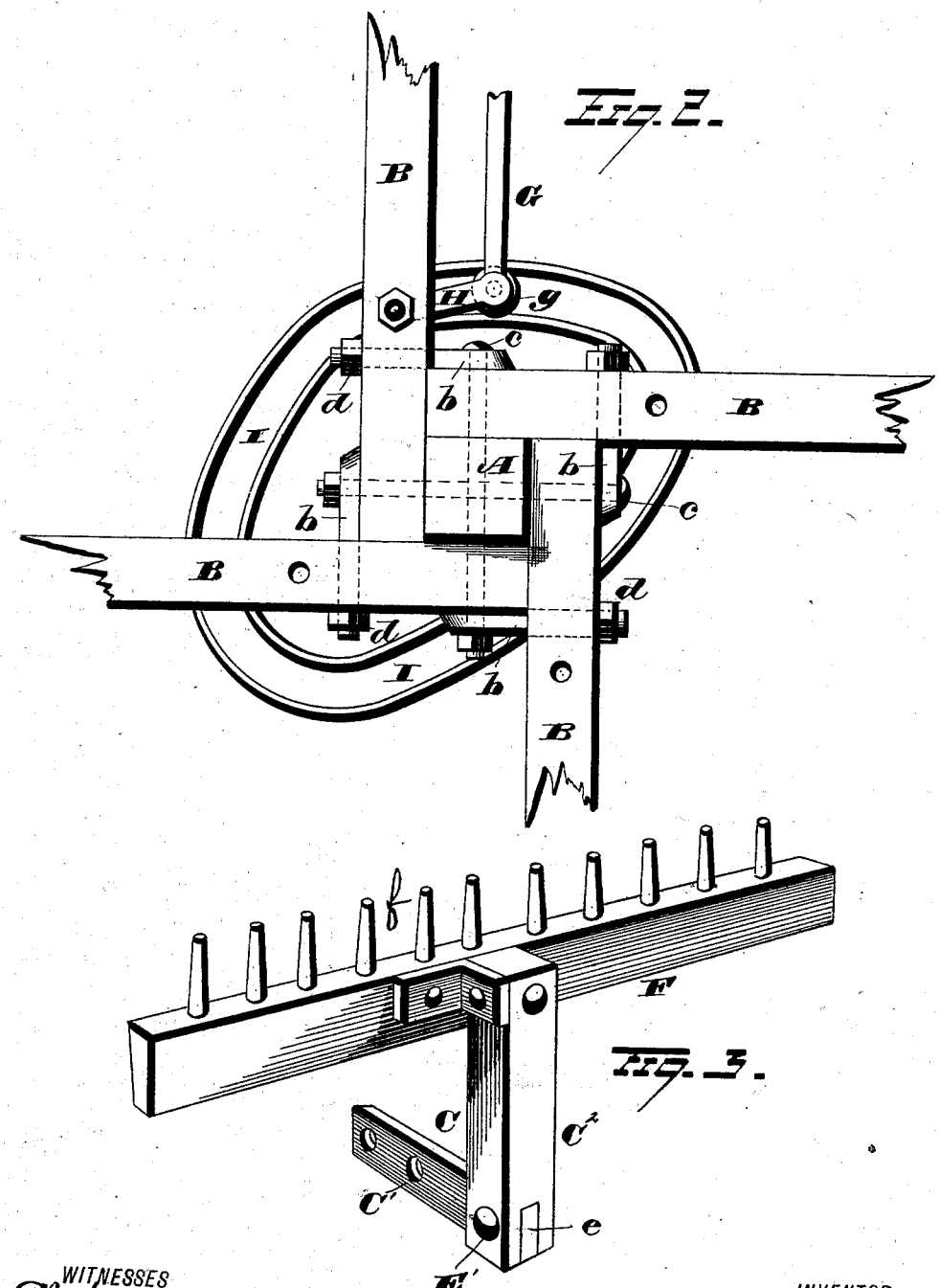

UNITED STATES PATENT OFFICE.

FREDERICK F. KANNE, OF WATERVILLE, MINNESOTA.

HARVESTER-REEL.

SPECIFICATION forming part of Letters Patent No. 272,057, dated February 13, 1883.

Application filed November 11, 1882. (No model.)

*To all whom it may concern:*

Be it known that I, F. F. KANNE, of Waterville, in the county of Le Sueur and State of Minnesota, have invented certain new and useful Improvements in Harvester-Reels; and I do hereby declare the following to be a full, clear, and exact description of the invention, such as will enable others skilled in the art to which it pertains to make and use the same.

My invention relates to an improvement in harvester-reels, the object of the same being to provide a strong, durable, and easily-constructed reel that can be manufactured at a small initial cost.

A further object is to provide simple means for automatically feathering the beaters as the reel revolves.

With these ends in view my invention consists in the parts and combinations of parts, as will be more fully described, and pointed out in the claims.

In the accompanying drawings, Figure 1 is a view in perspective of my improved reel. Fig. 2 is an end view of the same, showing the manner of securing the reel-arms to the reel-shaft; and Fig. 3 shows a detached view of the bent lever.

A represents the reel-shaft, one or both ends of which are adapted to be supported in suitable bearings, and B the reel-arms, rigidly secured to the said shaft in a manner to be hereinafter described. If the shaft should be journaled at both ends in suitable bearings, these reel-arms could be secured to the center of the shaft or near either end thereof; but when the shaft is only journaled at one end I prefer to use a short shaft and secure the arms thereto near its outer end. That portion of the shaft to which the reel-arms are secured is provided with as many angular faces $a$ as there are reel-arms B. In the drawings I have shown and in the specification will describe a four-armed reel; but it is evident that I can use as many arms and beaters as circumstances demand. One reel-arm B is first placed in position on one of the angular faces $a$ of the shaft A, and is secured thereon by the screw-bolt or spike $c$, which latter also holds the eyebolt $b$ in position. This eyebolt $b$ extends rearwardly and passes through a corresponding opening in the next reel-arm. This second reel-arm is placed in position at right angles to the first reel-arm, and is secured by the screw-bolt or spike $c$, as in the former case. The eyebolt on the first arm is then secured in the second arm by the nut $d$, which holds them in position. The third and fourth arms are then placed in position and secured to the reel-shaft and to the fourth and first arms, respectively, in the same manner. This construction is simple, economical, and durable, and the reel-arms are interlocked in such a manner as to prevent the possibility of their working loose or becoming detached from the reel-shaft. The reel-arms thus formed extend outward from the reel-shaft, and each is provided on its outer end with a movable beater adapted to be feathered or dipped once or more at each revolution of the reel, for the purpose of retaining the standing grain against the harvester-knives and prevent the grain from being carried over on the reel. The outer end of each reel-arm B is provided with an open slot, into which one end of the bent lever C is inserted and secured by the pivot-bolt D. This bent lever C is composed of the parts $C' C^2$, the part $C'$ being of metal and the part $C^2$ of wood. The metal portion $C'$ can be of any desired length, and is provided at its inner end with a bolt-hole for the passage of the bolt D, and at its opposite end with a tongue, $e$, adapted to bite or engage the wooden portion $C^2$ of the bent lever C, and with a bolt-hole for the passage of the bolt $E'$. The inner end of the wooden portion $C^2$ of the bent lever C is provided with an open slot for the reception of the outer end of the metallic piece $C'$ of the said bent lever. The outer end of the portion $C'$ of the lever is introduced into the slot of the portion $C^2$, and is secured therein by the bolt $E'$, which latter is assisted by the tongue $e$ in holding the two parts in position at right angles to each other.

If desired, I can dispense with the construction just described and construct my bent lever from a single piece of metal, either solid or tubular, or from two pieces of wood, as is most convenient. The bent levers are pivoted to the reel-arms, and each is provided at its outer end with a beater having the teeth $f$ secured thereto. The slats or beaters F, in the present instance, are secured about midway their length to the bent levers C in any suitable manner.

G is a link, the outer end of which is pivotally secured to the portion C' of the bent lever, while the rear or inner end thereof is secured to the crank H.

In the drawings I have only shown one bent lever and beater and means for operating the same; but each arm B has in practice a beater and bent lever which operate in precisely the same manner as the one herein specified.

The crank H, before referred to, is journaled in the arm B, and the rear end of the link G is secured to this crank and transmits its motion or movement to the toothed beaters. The inner end of each crank H is provided with a roller, g, adapted to move in a continuous cam-groove formed in the cam I. This cam I is loosely placed on the shaft A, and is regulated by any suitable handle, by means of which the cam is slightly turned. This cam, as before stated, rests loosely on the shaft, and as a consequence does not revolve therewith, and the roller g of the several cranks rest and move in the cam-groove. This cam-groove is curved to hold the beater in a vertical or approximately-vertical position while moving in the grain toward the harvester-cutters; but by means of the cam-regulating handle the cam can be so turned as to cause the beaters to dip more or less while therein, as circumstances demand. The cam is situated on the driver's side of the machine, and is provided with an eccentric hole or opening for the passage of the shaft A. By means of the lever before referred to the driver can while the machine is in motion give more or less pitch to the cam and to the joints of the reel, the cam being retained against rotary movement by the handle, which latter is held in any desired adjustment by any convenient means.

It is evident that numerous changes in the construction of the several parts of my improvement might be resorted to without departing from the spirit of my invention, and hence I would have it understood that I do not limit myself to the exact construction shown and described, but consider myself at liberty to make such changes and alterations as come within the spirit and scope of my invention.

Having fully described my invention, what I claim as new, and desire to secure by Letters Patent, is—

1. The combination, with the reel-shaft provided with angular faces, as described, of the reel-arms secured to the said shaft on the angular faces, and the eyebolts for securing the reel-arms together, substantially as set forth.

2. The combination, with the reel-shaft provided with a single set of radial arms, of bent levers pivotally secured to the outer ends of the radial arms, toothed slats or beaters secured to the bent levers, cranks journaled in the radial arms near their inner ends, links connecting the bent arms and cranks, and an eccentric loosely placed on the shaft and provided with a cam-groove in which one end of the cranks move, all of the above parts being combined and adapted to operate as described.

In testimony whereof I have signed this specification in the presence of two subscribing witnesses.

FREDERICK FRANK KANNE.

Witnesses:
M. R. EVERETT,
S. S. DICKINSON.